United States Patent
Lv

(10) Patent No.: US 10,325,080 B2
(45) Date of Patent: Jun. 18, 2019

(54) IDENTITY INFORMATION VERIFICATION

(71) Applicant: Alibaba Group Holding Limited, Grand Cayman (KY)

(72) Inventor: Gengmin Lv, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 35 days.

(21) Appl. No.: 15/599,799

(22) Filed: May 19, 2017

(65) Prior Publication Data

US 2017/0255764 A1 Sep. 7, 2017

Related U.S. Application Data

(63) Continuation of application No. PCT/CN2015/094315, filed on Nov. 11, 2015.

(30) Foreign Application Priority Data

Nov. 21, 2014 (CN) .......................... 2014 1 0677594

(51) Int. Cl.
*G06T 7/00* (2017.01)
*G06F 21/31* (2013.01)
(Continued)

(52) U.S. Cl.
CPC ............ *G06F 21/316* (2013.01); *G06F 21/31* (2013.01); *G06T 7/0002* (2013.01);
(Continued)

(58) Field of Classification Search
None
See application file for complete search history.

(56) References Cited

U.S. PATENT DOCUMENTS 6,907,134 B1 6/2005 Yamada et al.
8,438,184 B1 5/2013 Wang et al.
(Continued)

FOREIGN PATENT DOCUMENTS

CN 101316169 A 12/2008
CN 203689590 7/2014
(Continued)

OTHER PUBLICATIONS

Translation of International Search Report from corresponding PCT application No. PCT/CN2015/094315 dated Feb. 16, 2016, 2 pages.
(Continued)

*Primary Examiner* — Delomia L Gilliard
(74) *Attorney, Agent, or Firm* — Lee & Hayes, P.C.

(57) ABSTRACT

An example method for verifying identity information includes: receiving image information transmitted and rendered by a client; extracting feature information from the image information; matching the feature information with the feature determination information collected in advance; the feature determination information having associated identity information; determining whether the client fits with the identity information when the match is successful. The example embodiment of the present disclosure identifies a user on the basis of the uniqueness of the image information rendered by different client environments and clients, ensuring the accuracy of identification of user identity information, meanwhile avoiding the problem that the user identity information cannot be identified due to the shutdown of Cookie by clients, and raising the success rate of identification of identity information.

20 Claims, 3 Drawing Sheets

(51) Int. Cl.
    *H04W 12/06*     (2009.01)
    *H04W 12/12*     (2009.01)
    *H04L 29/06*     (2006.01)

(52) U.S. Cl.
    CPC ........ *H04L 63/0876* (2013.01); *H04L 63/102* (2013.01); *H04W 12/06* (2013.01); *H04W 12/12* (2013.01)

(56) References Cited

U.S. PATENT DOCUMENTS

| | | | | |
|---|---|---|---|---|
| 2004/0042663 | A1* | 3/2004 | Yamada | G06K 9/00711 382/217 |
| 2009/0028393 | A1 | 1/2009 | Kim et al. | |
| 2010/0223663 | A1* | 9/2010 | Morimoto | G06F 21/32 726/7 |

FOREIGN PATENT DOCUMENTS

| | | | | |
|---|---|---|---|---|
| CN | 203689590 | U | * | 7/2014 |
| CN | 104298909 | A | * | 1/2015 ............. G06F 21/32 |
| EP | 2407929 | A1 | | 1/2012 |
| JP | H11212990 | A | | 8/1999 |
| JP | 2000268175 | A | | 9/2000 |
| JP | 2002222426 | A | | 8/2002 |
| JP | 2004199614 | A | | 7/2004 |
| JP | 2005050103 | A | | 2/2005 |
| JP | P2009129337 | | | 6/2009 |
| JP | 201021805 | A | | 9/2010 |
| JP | 2013016185 | A | | 1/2013 |
| JP | 2013117876 | A | | 6/2013 |

OTHER PUBLICATIONS

Translation of Written Opinion from corresponding PCT application No. PCT/CN2015/094315 dated Feb. 16, 2016, 5 pages.

Acar, et al., "The Web Never Forgets: Persistent Tracking Mechanisms in the Wild", Computer and Communications Security, ACM, Nov. 3, 2014, pp. 674-689.

"Canvas fingerprinting", Wikipedia, retrieved on Nov. 30, 2017 at <<https://en.wikipedia.org/w/index.php?title=Canvas_fingerprinting&oldid=628306106>>, Oct. 5, 2014, 3 pages.

Extended European Search Report dated Apr. 3, 2018 for European Patent Application No. 15861101.2, 7 pages.

Mowery, et al., "Pixel Perfect: Fingerprinting Canvas in HTML5", retrieved on Jul. 23, 2014 at <<http://w2spconf.com/2012/papers/w2sp12-final4.pdf>>, Proceedings of Web 2.0 Security & Privacy Workshop (W2SP), May 24, 2012, pp. 1-12.

Japan Search Report dated Feb. 20, 2019 for Japan Patent Application No. 2017-527344, 23 pages.

Chinese Office Action for Application No. 201410677594.X, dated Nov. 29, 2018, Zhao, "Method and Apparatus for Verifying Identity Information", 6 pages.

Chinese Office Action for Application No. 201410677594.X, dated Dec. 20, 2017, Zhao, "Method and Apparatus for Verifying Identity Information", 9 pages.

Chinese Office Action for Application No. 201410677594.X, dated Jul. 13, 2018, Zhao, "Method and Apparatus for Verifying Identity Information", 10 pages.

Chinese Search Report dated Dec. 12, 2017 for Chinese Patent Application No. 2014104106775594.X, 1 page.

Chinese Search Report dated Jul. 4, 2018 for Chinese Patent Application No. 2014104106775594.X, 2 pages.

Japanese office action dated Mar. 12, 2019 in Japanese application No. 2017-527344, a foreign corresponding application of U.S. Appl. No. 15/599,799, 7 pages.

Yamaguchi, Shu, A VIEW2006-keynote lecture Security application and deployment of face image recognition, video information industrial, the 39th vol. No. 2, JP Industrial Hardware-for-development Style, Feb. 1, 2007, pp. 53-54, with English Abstract.

Asbestos Australian **, Web application development by SVG, XML Press vol. 3., JP, technical Hyoronsha, Jul. 10, 2001, pp. 60-67, with English Abstract.

Asbestos, it is thorough description from Australian **, and a communications protocol/graphics to networked home/B2B, the XML latest information and XML Press, vol. 2, the first edition, JP, Technical Hyoronsha, Dec. 25, 2000, pp. 12-19, with English Abstract.

Takei, Naoki, [Fingerprint of a terminal of other 6 person and a user], a proposal of a technique extracted only by CSS, mounting, and CSS2014 Computer Security Symposium 2014 collected paper, JP, general incorporated foundation information, Processing Society of Japan Computer Security Group, Oct. 15, 2014, pp. 370-377.

* cited by examiner

IDENTITY INFORMATION VERIFICATION

CROSS REFERENCE TO RELATED PATENT APPLICATION

This application claims priority to and is a continuation of PCT Patent Application No. PCT/CN2015/094315, filed on 11 Nov. 2015, which claims priority to Chinese Patent Application No. 201410677594.X, filed on 21 Nov. 2014, entitled "METHOD AND APPARATUS FOR IDENTITY INFORMATION VERIFICATION," which are hereby incorporated by reference in their entirety.

TECHNICAL FIELD

The present disclosure relates to the field of information verification technologies, and, in particular, to an identity information verification method and an identity information verification apparatus.

BACKGROUND

With the maturing and promotion of network technologies and the development of device hardware technologies, network user groups have grown significantly. Moreover, network users browse network information in various manners.

Generally, by collecting behavioral data of some users and analyzing the behavioral data, a network platform provides services for the users more precisely, for example, pushing news or some other specific activities.

Currently, behavioral data of a user is generally recorded by using the Cookie technology. Specifically, when the user visits a website, the website may permanently implant a piece of information containing a universally unique identifier (UUID) into a current browser Cookie of the user, and associate all behaviors of the user by using the information.

However, many security tools and browsers can disable the Cookie function. When the Cookie function is disabled, the website cannot identify the user, and therefore can hardly collect behavioral data of the user.

Therefore, a technical problem to be urgently solved by persons skilled in the art is how to provide an identity information verification mechanism to improve a success rate of identification of the identity information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

A technical problem to be solved by example embodiments of the present disclosure is to provide an identity information verification mechanism to improve a success rate of identification of the identity information.

Correspondingly, the example embodiments of the present disclosure further provide an identity information verification apparatus, to guarantee the implementation and application of the foregoing method.

To solve the foregoing problem, an example embodiment of the present disclosure discloses an identity information verification method, including:
receiving image information sent by a client terminal and rendered by the client terminal;
extracting characteristic information from the image information;
matching the characteristic information with pre-collected characteristic judgment information, the characteristic judgment information having associated identity information; and
judging, when the matching succeeds, that the client terminal fits the identity information.

For example, the image information is a vector graph.

For example, the image information is obtained by the client terminal through rendering according to scalable vector graphics.

For example, the step of matching the characteristic information with pre-collected characteristic judgment information includes:
calculating a similarity degree between the characteristic information and the pre-collected characteristic judgment information;
judging whether the similarity degree is greater than a preset similarity degree threshold;
if yes, judging that the matching between the characteristic information and the pre-collected characteristic judgment information succeeds; and
if no, judging that the matching between the characteristic information and the pre-collected characteristic judgment information fails.

For example, the characteristic information includes at least one of shape characteristic information and color characteristic information;
the characteristic judgment information includes at least one of shape characteristic judgment information and color characteristic judgment information; and
the step of calculating a similarity degree between the characteristic information and the pre-collected characteristic judgment information includes:
calculating a similarity degree between at least one of the shape characteristic information and the color characteristic information and at least one of the corresponding shape characteristic judgment information and color characteristic judgment information.

For example, the method further includes:
configuring new identity information for the client terminal when the matching fails; and
establishing an association between the characteristic information and the new identity information.

An example embodiment of the present disclosure further discloses an identity information verification apparatus, including:
an image information receiving module configured to receive image information sent by a client terminal and rendered by the client terminal;
a characteristic information extraction module configured to extract characteristic information from the image information;
a characteristic information judgment module configured to match the characteristic information with pre-collected characteristic judgment information, the characteristic judgment information having associated identity information; and
an identity information judgment module configured to judge, when the matching succeeds, that the client terminal fits the identity information.

For example, the image information is a vector graph.

For example, the image information is obtained by the client terminal through rendering according to scalable vector graphics.

For example, the characteristic information judgment module includes:

a similarity degree calculation sub-module configured to calculate a similarity degree between the characteristic information and the pre-collected characteristic judgment information;

a preset judgment sub-module configured to judge whether the similarity degree is greater than a preset similarity degree threshold; if yes, call a first judgment sub-module; if no, call a second judgment sub-module;

the first judgment sub-module configured to judge that the matching between the characteristic information and the pre-collected characteristic judgment information succeeds; and the second judgment sub-module configured to judge that the matching between the characteristic information and the pre-collected characteristic judgment information fails.

For example, the characteristic information includes at least one of shape characteristic information and color characteristic information;

the characteristic judgment information includes at least one of shape characteristic judgment information and color characteristic judgment information; and the similarity degree calculation sub-module includes:

a characteristic similarity degree calculation sub-module configured to calculate a similarity degree between at least one of the shape characteristic information and the color characteristic information and at least one of the corresponding shape characteristic judgment information and color characteristic judgment information.

For example, the apparatus further includes:

an identity information configuration module configured to configure new identity information for the client terminal when the matching fails; and an association establishment module configured to establish an association between the characteristic information and the new identity information.

An example embodiment of the present disclosure further discloses an identity information verification apparatus, including:

one or more processors; and one or more memories stored thereon computer readable instructions that, when executed by the one or more processors, cause the one or more processors to perform acts comprising:

receiving image information sent by a client terminal;

extracting characteristic information from the image information;

matching the characteristic information with pre-collected characteristic judgment information, the characteristic judgment information having associated identity information; and judging, when the matching succeeds, that the client terminal fits the identity information.

For example, the image information is a vector graph.

For example, the image information is obtained by the client terminal through rendering according to scalable vector graphics.

For example, the matching the characteristic information with pre-collected characteristic judgment information includes:

calculating a similarity degree between the characteristic information and the pre-collected characteristic judgment information; and judging that the similarity degree is greater than a preset similarity degree threshold; and judging that the matching between the characteristic information and the pre-collected characteristic judgment information succeeds.

For example, the matching the characteristic information with pre-collected characteristic judgment information includes:

calculating a similarity degree between the characteristic information and the pre-collected characteristic judgment information; and judging that the similarity degree is no greater than a preset similarity degree threshold; and judging that the matching between the characteristic information and the pre-collected characteristic judgment information fails.

For example, the characteristic information includes at least one of shape characteristic information and color characteristic information; and the characteristic judgment information includes at least one of shape characteristic judgment information and color characteristic judgment information.

For example, the calculating the similarity degree between the characteristic information and the pre-collected characteristic judgment information includes:

calculating a similarity degree between at least one of the shape characteristic information and the color characteristic information and at least one of the corresponding shape characteristic judgment information and color characteristic judgment information.

For example, wherein the acts further comprise:

configuring new identity information for the client terminal when the matching fails; and establishing an association between the characteristic information and the new identity information.

An example embodiment of the present disclosure further discloses one or more memories stored thereon computer readable instructions that, when executed by one or more processors, cause the one or more processors to perform acts comprising:

receiving image information sent by a client terminal;

extracting characteristic information from the image information, the characteristic information including at least one of shape characteristic information and color characteristic information;

matching the characteristic information with pre-collected characteristic judgment information, the characteristic judgment information having associated identity information, the pre-collected characteristic judgment information including at least one of shape characteristic judgment information and color characteristic judgment information, the matching including calculating a similarity degree between at least one of the shape characteristic information and the color characteristic information and at least one of the corresponding shape characteristic judgment information and color characteristic judgment information;

judging that the similarity degree is greater than a preset similarity degree threshold;

judging that the matching between the characteristic information and the pre-collected characteristic judgment information succeeds; and judging that the client terminal fits the identity information.

For example, the image information is a vector graph.

The features of the above example embodiments may be referenced to each other.

Compared with the conventional techniques, the example embodiments of the present disclosure have the following advantages:

The example embodiments of the present disclosure extract characteristic information from image information rendered by a client terminal, match the characteristic information with pre-collected characteristic judgment information, and judge, when the matching succeeds, that the client terminal fits identity information associated with the characteristic judgment information; a user is identified on the basis of different client terminal environments and the uniqueness of the image information rendered by the client terminal, thus ensuring the accuracy of identifying user identity information, and meanwhile avoiding the problem that the user identity information cannot be identified because the client terminal disables the Cookie, thereby improving a success rate of identification of the identity information.

DETAILED DESCRIPTION

To make the foregoing objectives, features, and advantages of the present disclosure clearer and easier to understand, the present disclosure is further described in detail below with reference to the accompanying drawings and specific implementations.

Figure 1:
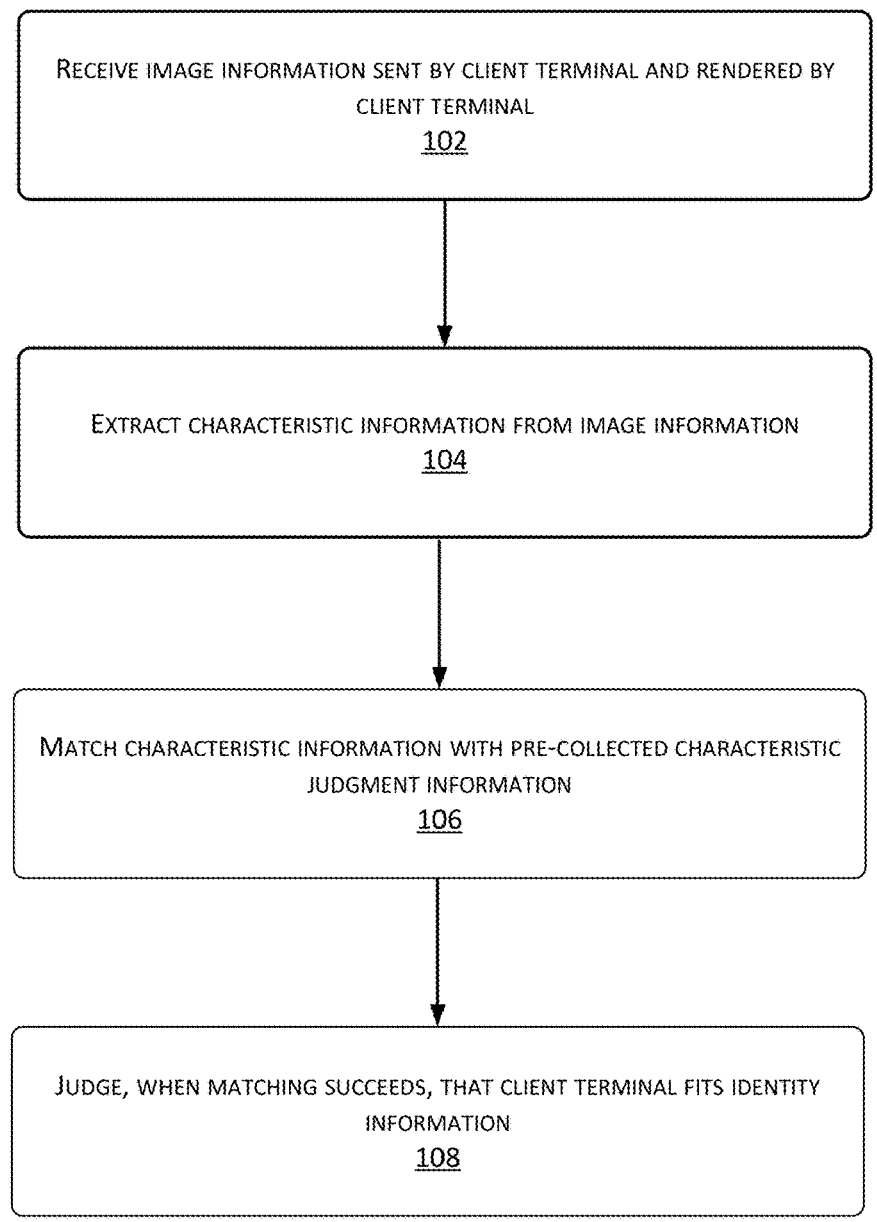
FIG. 1 is a step flowchart of an example identity information verification method according to the present disclosure.

Refer to FIG. 1, which is a step flowchart of an example embodiment of an identity information verification method according to the present disclosure. The method may include the following steps:

Step 102: receiving image information sent by a client terminal and rendered by the client terminal.

In an implementation, a user may send a webpage loading request to a webpage server by means of a client terminal such as a browser or an application with a built-in browser component.

For example, the user may request loading of a webpage by clicking a link, or request loading of a webpage by entering a URL in an address bar, or the like. When the user clicks a link, it is equivalent to reception of a webpage loading request; likewise, when the user enters a URL in the address bar and clicks an OK button or presses an Enter key, it is also equivalent to reception of a webpage loading request.

The webpage server performs processing after receiving the webpage loading request, and finally returns a response to the client terminal. The client terminal may receive a webpage document from the webpage server, and the client terminal may parse and display the webpage document, where the webpage document may include webpage resources such as text information and image information.

In an c implementation, the image information may be a vector graph.

The vector graph is a graphic drawn according to geometric characteristics, a vector may be a point or a line, and the vector graph can only be generated relying on applications (client terminals such as a browser); the file occupies a relatively small internal space because the image file of this type includes independent separate images that can be freely recombined without any limitation. A feature thereof is that an image will not be distorted after being enlarged, which has nothing to do with resolution.

In an example embodiment of the present disclosure, the image information may be obtained by the client terminal through rendering according to Scalable Vector Graphics (SVG).

The SVG is a label of HTML5 (the fifth significant modification of the HyperText Markup Language), specifically may refer to a language defined by using an Extensible Markup Language (XML), and is used to describe two-dimensional vectors and vector/grid graphics.

The SVG provides 3 types of graphic objects: vector graphic shape (such as a path formed by a straight line and a curve), image, and text.

An example of the SVG may be shown as follows:

```
<svg version=" 1.1" baseProfile="full"
xmlns="http://www.w3.org/2000/svg">
    <rect width="100%" height="100%" fill="red" />
    <circle cx="150" cy="100" r="80" fill="green" />
    <text x="150"y="125" font-size="60" text-anchor="middle"
fill="white">SVG</text>
    </svg>
```

Figure 2:
FIG. 2 is a diagram of an example of image information obtained through rendering according to Scalable Vector Graphics (SVG) according to the present disclosure.

Image information rendered by the client terminal according to the above example of the SVG is as shown in FIG. 2.

From a macroscopic perspective, different client terminals use different rendering engines (for example, rendering engines with a Trident kernel, a Gecko kernel, a Webkit kernel, and a Presto kernel are different), render options set in the rendering engines may also be different, and graphic hardware required for rendering (for example, a Central Processing Unit (CPU), a Graphic Processing Unit (GPU), and the like) may also be different; all these factors would affect image information rendered by the client terminals.

From the perspective of pixels, operating systems to which the client terminals belong use different settings (for example, render hardware and software settings used by the systems) and algorithms to perform anti-aliasing and sub-pixel rendering operations respectively; all these factors would also affect the image information rendered by the client terminals.

Generally, it is almost impossible that terminal devices to which different client terminals belong have identical configurations, and for rendering of the image information, processing on the operating system and client terminal level would be involved. Therefore, different client terminals may render different image information. If the image information has a tiny characteristic change, even if the change is a small change in some pixels or the color, it can still be identified.

Certainly, the above judgment image information is merely used as an example, and during implementation of this example embodiment of the present disclosure, other image information may be set according to actual conditions, as long as the uniqueness of the rendered image information can be implemented, which is not limited in this example embodiment of the present disclosure. In addition, apart from the foregoing image information, persons skilled in the art may also use other image information according to an actual need, which is not limited in this example embodiment of the present disclosure either.

In an actual application, when obtaining the image information by means of rendering, the client terminal may send the image information to the webpage server or another sever, which is not limited in this example embodiment of the present disclosure.

Step 104: extracting characteristic information from the image information.

It should be noted that, the characteristic information may refer to information that represents image features.

In an example embodiment of the present disclosure, the characteristic information may include at least one of shape characteristic information and color characteristic information;

wherein, the shape characteristic information may refer to information representing an image shape feature, and the color characteristic information may refer to information representing an image color feature.

There are mainly two types of methods for representing the shape characteristic information, one is region characteristic, which is mainly specific to the whole shape region of an image; and the other is contour characteristic, which is specific to an outer boundary of an object.

Typical method for extracting the shape characteristic information include a boundary characteristic value method (an outer boundary of the image), a geometric parameter method (geometric parameterization processing of the image), a shape moment invariant method (finding a moment invariant characteristic of the image), a Fourier shape description method (Fourier transform method), and the like.

The color characteristic information may be described by using a color characteristic of the image or image region, and it has integrality.

Typical methods for extracting the color characteristic information include color histogram, color set, color moment, and the like.

Certainly, the above judgment characteristic information is merely used as an example, and during implementation of this example embodiment of the present disclosure, other characteristic information may be set according to actual conditions, which is not limited in this example embodiment of the present disclosure. In addition, apart from the foregoing characteristic information, persons skilled in the art may also use other characteristic information according to an actual need, which is not limited in this example embodiment of the present disclosure either.

Step 106: matching the characteristic information with pre-collected characteristic judgment information;

Terminal devices such as mobile phones and personal computers are generally personal belongings, and are used by users to whom they belong; most features of the client terminal and the terminal device to which it belongs are stable, and the client terminal can render image information with uniqueness. Therefore, in this example embodiment of the present disclosure, the user may be identified by using the image information.

When this example embodiment of the present disclosure is applied, characteristic information of the image information may be collected in advance, a user identifier is configured for the client terminal, and an association between the characteristic information and the user identifier is established and stored in a database, for example, a relational database MySQL or the like. The characteristic information may be set as characteristic judgment information; in this case, the characteristic judgment information may have associated identity information, for use in subsequent user identifier query and identification, and if necessary, query may be performed according to a query statement provided by the database.

The user identifier may refer to a unique identifier of the user, for example, a user Identity (ID), or the like.

In an example embodiment of the present disclosure, the characteristic judgment information may include at least one of shape characteristic judgment information and color characteristic judgment information.

Specifically, if the pre-collected characteristic information includes the shape characteristic information of the image information, the shape characteristic information associated with the user identifier may be set as the shape judgment characteristic information; if the pre-collected characteristic information includes the color characteristic information of the image information, the shape characteristic information associated with the user identifier may be set as the color judgment characteristic information.

In an example embodiment of the present disclosure, step 106 may include the following sub steps:

A first substep: calculating a similarity degree between the characteristic information and the pre-collected characteristic judgment information;

In specific implementation, the similarity degree between the characteristic information and the pre-collected characteristic judgment information may be calculated by means of a Bhattacharyya distance, a chi-square distance, a cosine distance, an Euclidean distance, histogram intersection, a normalized Euclidean distance, normalized histogram intersection, and the like, which are not limited in this example embodiment of the present disclosure.

In an example embodiment of the present disclosure, the first substep may include the following sub step:

calculating a similarity degree between at least one of the shape characteristic information and the color characteristic information and at least one of the corresponding shape characteristic judgment information and color characteristic judgment information.

In this example, if the extracted characteristic information includes shape characteristic information, a similarity degree between the shape characteristic judgment information may be calculated; if the extracted characteristic information includes color characteristic information, a similarity degree between the color characteristic judgment information may be calculated.

A second substep: judging whether the similarity degree is greater than a preset similarity degree threshold; if yes, executing substep S13; if no, executing substep S14;

A third substep: judging that the matching between the characteristic information and the pre-collected characteristic judgment information succeeds.

A fourth substep: judging that the matching between the characteristic information and the pre-collected characteristic judgment information fails.

In this example embodiment of the present disclosure, a certain gray value may be allowed according to an actual need; in other words, if the characteristic information of the image information satisfies a probability in a particular interval, an error may be allowed.

In this case, if most characteristics of the client terminal and the terminal device to which it belongs are stable, and there are merely several differences due to user settings, fitting to the same user identifier is also allowed.

Specifically, a similarity degree threshold (such as 80%) may be preset based on training of a large volume of data, and if the similarity degree between the characteristic information and the characteristic judgment information is greater than the similarity degree threshold, it may indicate that the characteristic information matches the characteristic judgment information; otherwise, it may indicate that the characteristic information does not match the characteristic judgment information.

Step 108: judging, when the matching succeeds, that the client terminal fits the identity information.

When the matching succeeds, it may be considered that the client terminal rendering the image information to which the characteristic information belongs and the client terminal rendering the image information to which the characteristic judgment information belongs are the same client terminal, the verification of the identity information is passed, and it can be considered that the current client terminal fits the preconfigured identity information.

After the identity information fitting the current client terminal is identified, corresponding business processing may be performed.

For example, behavior information such as webpage browsing and video watching of the user may be recorded, to analyze behavior characteristics of the user.

For another example, information conforming to behavior characteristics of the user, such as advertisements and news, may be pushed to the user.

Certainly, this example embodiment of the present disclosure may further carry out other business processing, which is not limited in this example embodiment of the present disclosure.

This example embodiment of the present disclosure extracts characteristic information from image information rendered by a client terminal, matches the characteristic information with pre-collected characteristic judgment information, and judges, when the matching succeeds, that the client terminal fits identity information associated with the characteristic judgment information; a user is identified on the basis of different client terminal environments and the uniqueness of the image information rendered by the client terminal, thus ensuring the accuracy of identifying user identity information, and meanwhile avoiding the problem that the user identity information cannot be identified because the client terminal disables the Cookie, thereby improving a success rate of identification of the identity information.

In an example embodiment of the present disclosure, the following steps may further be included:

configuring new identity information for the client terminal when the matching fails; and establishing an association between the characteristic information and the new identity information.

When the matching between the characteristic information and the pre-collected characteristic judgment information fails, it can be considered that the database does not store information of the current client terminal; therefore, a user identifier is configured for the client terminal, and an association between the characteristic information and the user identifier is established and stored in the database, where the characteristic information may be set as the characteristic judgment information, for use in subsequent user identifier query and identification.

It should be noted that, for ease of description, the method example embodiment is expressed as a series of action combinations. However, persons skilled in the art should understand that the example embodiments of the present disclosure are not limited to the described order of actions, because some steps may be performed in other order or simultaneously according to the example embodiments of the present disclosure. Secondly, persons skilled in the art should also understand that the example embodiments described in the specification are all preferred example embodiments, and the involved actions are not mandatory to the example embodiments of the present disclosure.

Figure 3:
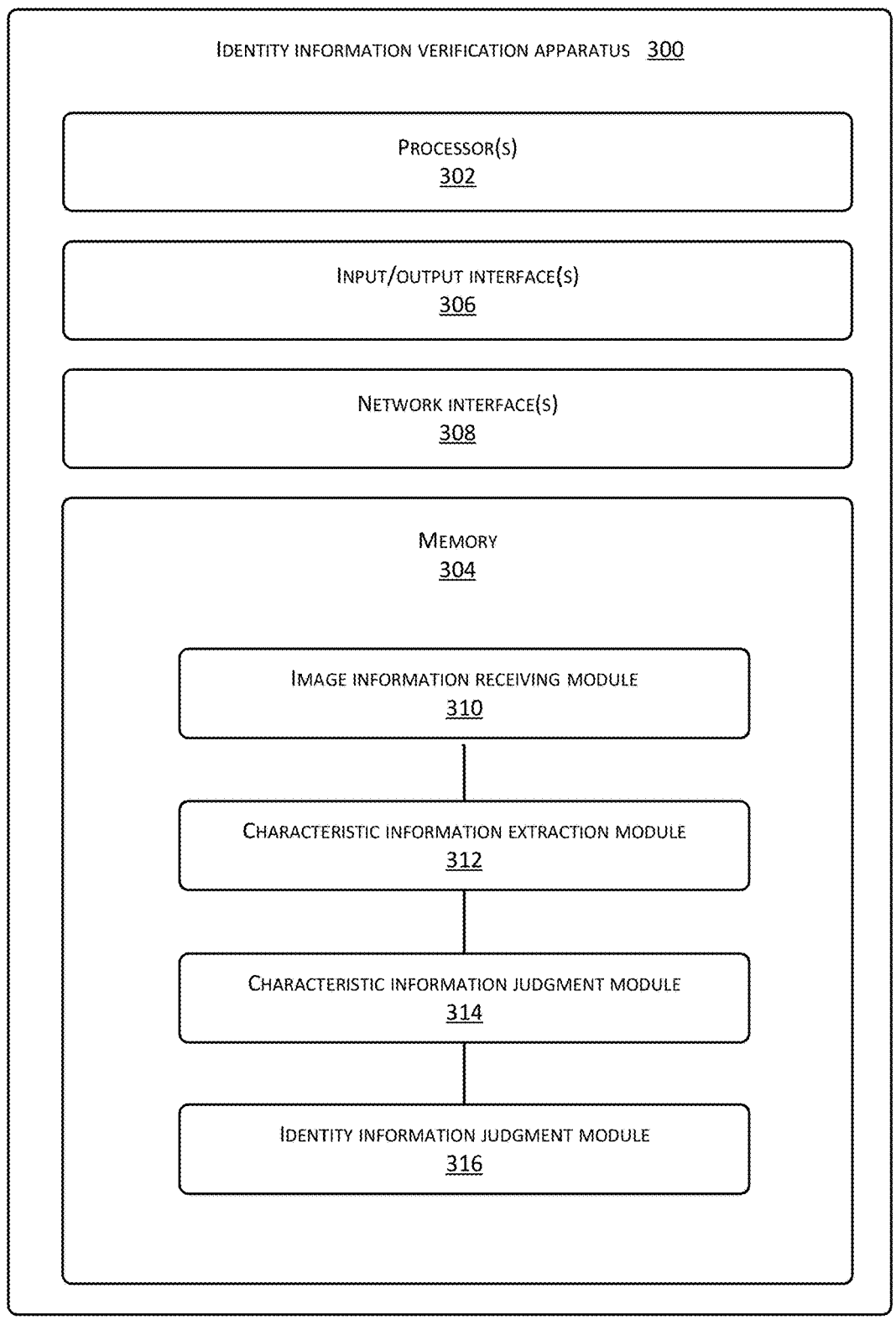
FIG. 3 is a structural block diagram of an example identity information verification apparatus according to the present disclosure.

Referring to FIG. 3, which is a structural block diagram of an example embodiment of an identity information verification apparatus 300 according to the present disclosure. The identity information verification apparatus 300 includes one or more processor(s) 302 or data processing unit(s) and memory 304. The identity information verification apparatus 300 may further include one or more input/output interface(s) 306, and network interface(s) 308. The memory 304 is an example of computer readable media.

The memory 304 may store therein a plurality of modules or units including:

an image information receiving module 310 configured to receive image information sent by a client terminal and rendered by the client terminal;

a characteristic information extraction module 312 configured to extract characteristic information from the image information;

a characteristic information judgment module 314 configured to match the characteristic information with pre-collected characteristic judgment information, the characteristic judgment information having associated identity information; and an identity information judgment module 316 configured to judge, when the matching succeeds, that the client terminal fits the identity information.

In specific implementation, the image information may be a vector graph.

In an example embodiment of the present disclosure, the image information may be obtained by the client terminal through rendering according to scalable vector graphics.

In an example embodiment of the present disclosure, the characteristic information judgment module 314 may include the following sub-modules:

a similarity degree calculation sub-module configured to calculate a similarity degree between the characteristic information and the pre-collected characteristic judgment information;

a preset judgment sub-module configured to judge whether the similarity degree is greater than a preset similarity degree threshold; if yes, call a first judgment sub-module; if no, call a second judgment sub-module;

the first judgment sub-module configured to judge that the matching between the characteristic information and the pre-collected characteristic judgment information succeeds; and the second judgment sub-module configured to judge that the matching between the characteristic information and the pre-collected characteristic judgment information fails.

In an example embodiment of the present disclosure, the characteristic information includes at least one of shape characteristic information and color characteristic information;

the characteristic judgment information includes at least one of shape characteristic judgment information and color characteristic judgment information; and the similarity degree calculation sub-module may include the following sub-modules:

a characteristic similarity degree calculation sub-module configured to calculate a similarity degree between at least one of the shape characteristic information and the color characteristic information and at least one of the corresponding shape characteristic judgment information and color characteristic judgment information.

In an example embodiment of the present disclosure, the apparatus 300 may further include the following modules:

an identity information configuration module configured to configure new identity information for the client terminal when the matching fails; and an association establishment module configured to establish an association between the characteristic information and the new identity information.

The example apparatus embodiment is described in a relatively simple way because it is basically similar to the method example embodiment; for related parts, refer to partial description in the method example embodiment.

Various example embodiments in the specification are described in a progressive manner. In each example embodiment, the portion that is different from other example embodiments is focused on and described. The same or similar parts between the example embodiments may be referenced to one another.

Persons skilled in the art should understand that, the example embodiments of the present disclosure may be provided as a method, an apparatus, or a computer program product. Therefore, the example embodiments of the present disclosure may be implemented in the form of a completely hardware example embodiment, a completely software example embodiment, or an example embodiment combining software and hardware. Moreover, the example embodiments of the present disclosure may employ the form of a computer program product implemented on one or more computer usable storage media (including, but not limited to, a magnetic disk memory, a CD-ROM, an optical memory, and the like) including computer usable program codes.

In a typical configuration, the computer device or apparatus includes one or more Central Processing Units (CPUs), an I/O interface, a network interface, and a memory. The memory may include computer readable media such as a volatile memory, a Random Access Memory (RAM), and/or a non-volatile memory, e.g., Read-Only Memory (ROM) or flash RAM, and so on. The memory is an example of a computer readable medium. Computer readable media include permanent, non-permanent, mobile and non-mobile media, which can implement information storage through any method or technology. The information may be computer readable instructions, data structures, program modules or other data. Examples of storage media of computers include, but are not limited to, a Phase-change RAM (PRAM), a Static RAM (SRAM), a Dynamic RAM (DRAM), other types of Random Access Memories (RAMs), a Read-Only Memory (ROM), an Electrically Erasable Programmable Read-Only Memory (EEPROM), a flash memory or other memory technologies, a Compact Disk Read-Only Memory (CD-ROM), a Digital Versatile Disc (DVD) or other optical memories, a cassette, a cassette and disk memory or other magnetic memory devices or any other non-transmission media, which can be used for storing information accessible to the computation device. According to the definitions herein, the computer readable media exclude transitory computer readable medium (transitory media), such as modulated data signals and carriers.

The example embodiments of present disclosure are described with reference to flowcharts and/or block diagrams of the method, terminal device (system), and computer program product according to the example embodiments of the present disclosure. It should be understood that computer program instructions may be used to implement each process and/or block in the flowcharts and/or block diagrams as well as a combination of a process and/or a block in the flowcharts and/or the block diagrams. These computer program instructions may be provided for a general-purpose computer, a special-purpose computer, an embedded processor, or a processor of any other data programmable processing terminal device to generate a machine, so that the instructions executed by a computer or a processor of any other programmable data processing terminal device generate an apparatus for implementing a function specified in one or more processes in the flowcharts and/or in one or more blocks in the block diagrams.

These computer program instructions may also be stored in a computer readable memory that can instruct the computer or any other programmable data processing terminal device to work in a particular manner, such that the instructions stored in the computer readable memory generate an article of manufacture that includes an instruction apparatus. The instruction apparatus implements a function specified in one or more processes in the flowcharts and/or in one or more blocks in the block diagrams.

These computer program instructions may also be loaded onto a computer or another programmable data processing terminal device, such that a series of operating steps are performed on the computer or another programmable terminal device, thereby generating computer-implemented processing. Therefore, the instructions executed on the computer or another programmable terminal device provide steps for implementing a function specified in one or more processes in the flowcharts and/or in one or more blocks in the block diagrams.

Although the preferred example embodiments of the example embodiments of the present disclosure have been described above, once knowing the basic creative concept, persons skilled in the art may make other alterations and modifications to these example embodiments. Therefore, the appended claims are intended to be interpreted as including the preferred example embodiments and all alterations and modifications that fall in the scope of the example embodiments of the present disclosure.

Finally, it should be further noted that, relational terms such as "first" and "second" herein are merely used for distinguishing one entity or operation from another entity or operation, but do not necessarily require or imply the presence of any such actual relation or sequence between these entities or operations. Moreover, the terms "include", "comprise", or any other variants thereof are intended to cover a non-exclusive inclusion, such that a process, a method, an article, or a terminal device that includes a series of elements not only includes such elements but also includes other elements not specified expressly, or further includes inherent elements of the process, method, article, or terminal device. In the absence of more restrictions, an element limited by "include a/an . . . " does not exclude other same elements existing in the process, method, article, or terminal device that includes the element.

An identity information verification method and an identity information verification apparatus provided by the present disclosure are described in detail above. Specific examples are used herein to illustrate the principle and implementations of the present disclosure, and the above description of the example embodiments is merely for helping understand the method of the present disclosure and the core idea thereof; meanwhile, for persons of ordinary skills in the art, changes may be made to the specific implementations and application scopes according to the idea of the present disclosure. In conclusion, the content of the specification should not be construed as a limitation to the present disclosure.

What is claimed is:

1. A method comprising:
   receiving image information sent by a client terminal;
   extracting characteristic information from the image information;
   matching the characteristic information with pre-collected characteristic judgment information, the pre-collected characteristic judgment information having associated identity information related to a uniqueness of rendering the image information by the client terminal, the pre-collected characteristic judgment information including at least one of shape characteristic judgment information and color characteristic judgment information; and
   judging, when the matching succeeds, that the client terminal fits the identity information.

2. The method of claim 1, wherein the image information is a vector graph.

3. The method of claim 2, wherein the image information is obtained by the client terminal through rendering according to scalable vector graphics.

4. The method of claim 1, wherein the matching the characteristic information with the pre-collected characteristic judgment information includes:
   calculating a similarity degree between the characteristic information and the pre-collected characteristic judgment information; and
   judging that the similarity degree is greater than a preset similarity degree threshold; and
   judging that the matching between the characteristic information and the pre-collected characteristic judgment information succeeds.

5. The method of claim 1, wherein the matching the characteristic information with the pre-collected characteristic judgment information includes:
   calculating a similarity degree between the characteristic information and the pre-collected characteristic judgment information; and
   judging that the similarity degree is no greater than a preset similarity degree threshold; and
   judging that the matching between the characteristic information and the pre-collected characteristic judgment information fails.

6. The method of claim 5, wherein the characteristic information includes at least one of shape characteristic information and color characteristic information.

7. The method of claim 6, wherein the characteristic judgment information comprises at least one of shape characteristic judgment information and color characteristic judgment information.

8. The method of claim 6, wherein the calculating the similarity degree between the characteristic information and the pre-collected characteristic judgment information includes:
   calculating a similarity degree between at least one of the shape characteristic information and the color characteristic information and at least one of the corresponding shape characteristic judgment information and color characteristic judgment information.

9. The method of claim 1, further comprising:
   configuring new identity information for the client terminal when the matching fails; and
   establishing an association between the characteristic information and the new identity information.

10. An apparatus comprising:
    one or more processors; and
    one or more memories stored thereon computer readable instructions that, when executed by the one or more processors, cause the one or more processors to perform acts comprising:
    receiving image information sent by a client terminal;
    extracting characteristic information from the image information;
    matching the characteristic information with pre-collected characteristic judgment information, the characteristic judgment information having associated identity information related to a uniqueness of rendering the image information by the client terminal; and
    judging, when the matching succeeds, that the client terminal fits the identity information.

11. The apparatus of claim 10, wherein the image information is a vector graph.

12. The apparatus of claim 10, wherein the image information is obtained by the client terminal through rendering according to scalable vector graphics.

13. The apparatus of claim 10, wherein the matching the characteristic information with pre-collected characteristic judgment information includes:
    calculating a similarity degree between the characteristic information and the pre-collected characteristic judgment information; and
    judging that the similarity degree is greater than a preset similarity degree threshold; and
    judging that the matching between the characteristic information and the pre-collected characteristic judgment information succeeds.

14. The apparatus of claim 10, wherein the matching the characteristic information with pre-collected characteristic judgment information includes:
    calculating a similarity degree between the characteristic information and the pre-collected characteristic judgment information; and
    judging that the similarity degree is no greater than a preset similarity degree threshold; and
    judging that the matching between the characteristic information and the pre-collected characteristic judgment information fails.

15. The apparatus of claim 10, wherein:
    the characteristic information includes at least one of shape characteristic information and color characteristic information; and
    the characteristic judgment information includes at least one of shape characteristic judgment information and color characteristic judgment information.

16. The apparatus of claim 15, wherein the calculating the similarity degree between the characteristic information and the pre-collected characteristic judgment information includes:
    calculating a similarity degree between at least one of the shape characteristic information and the color characteristic information and at least one of the corresponding shape characteristic judgment information and color characteristic judgment information.

17. The apparatus of claim 10, wherein the acts further comprise:
    configuring new identity information for the client terminal when the matching fails; and
    establishing an association between the characteristic information and the new identity information.

18. One or more memories stored thereon computer readable instructions that, when executed by one or more processors, cause the one or more processors to perform acts comprising:
- receiving image information sent by a client terminal;
- extracting characteristic information from the image information, the characteristic information including at least one of shape characteristic information and color characteristic information;
- matching the characteristic information with pre-collected characteristic judgment information, the characteristic judgment information having associated identity information, the pre-collected characteristic judgment information including at least one of shape characteristic judgment information and color characteristic judgment information related to a uniqueness of rendering the image information by the client terminal due to hardware and software setting used by the client terminal, the matching including calculating a similarity degree between at least one of the shape characteristic information and the color characteristic information and at least one of the corresponding shape characteristic judgment information and color characteristic judgment information;
- judging that the similarity degree is greater than a preset similarity degree threshold;
- judging that the matching between the characteristic information and the pre-collected characteristic judgment information succeeds; and
- judging that the client terminal fits the identity information.

19. The one or more memories of claim 17, wherein the image information is a vector graph.

20. The one or more memories of claim 19, wherein the image information is obtained by the client terminal through rendering according to scalable vector graphics.

* * * * *